(12) United States Patent
Monette

(10) Patent No.: US 8,127,011 B2
(45) Date of Patent: Feb. 28, 2012

(54) NETWORK RESOURCE NEGOTIATION BETWEEN A SERVICE PROVIDER NETWORK AND AN ACCESS NETWORK

(75) Inventor: Sylvain Monette, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 944 days.

(21) Appl. No.: 11/690,453

(22) Filed: Mar. 23, 2007

(65) Prior Publication Data

US 2008/0235379 A1  Sep. 25, 2008

(51) Int. Cl.
*G06F 15/173* (2006.01)
*G06F 15/177* (2006.01)
*G06F 15/16* (2006.01)

(52) U.S. Cl. .......... 709/226; 710/52; 455/417; 370/230; 370/401

(58) Field of Classification Search .......... 709/217–228; 710/52; 455/417; 370/230, 410
See application file for complete search history.

(56) References Cited

U.S. PATENT DOCUMENTS

| | | | |
|---|---|---|---|
| 6,335,927 B1 * | 1/2002 | Elliott et al. ................... | 370/352 |
| 7,042,851 B1 * | 5/2006 | Rahman et al. ................ | 370/259 |
| 7,171,678 B2 | 1/2007 | Buehl et al. | |
| 7,194,000 B2 * | 3/2007 | Balachandran et al. . | 370/395.42 |
| 7,369,844 B2 * | 5/2008 | Hestir ............................ | 455/417 |
| 2007/0130389 A1 * | 6/2007 | Petersson et al. ............... | 710/52 |
| 2007/0291667 A1 * | 12/2007 | Huber et al. .................... | 370/260 |
| 2008/0095049 A1 * | 4/2008 | Bugenhagen et al. ......... | 370/229 |
| 2008/0095173 A1 * | 4/2008 | Bugenhagen ............ | 370/395.21 |
| 2008/0144494 A1 * | 6/2008 | Casey ............................ | 370/230 |
| 2008/0205267 A1 * | 8/2008 | El Barachi et al. ........... | 370/230 |
| 2008/0219277 A1 * | 9/2008 | Pratap et al. ................... | 370/406 |
| 2008/0280623 A1 * | 11/2008 | Danne et al. ................... | 455/453 |
| 2009/0190603 A1 * | 7/2009 | Damola et al. ................ | 370/401 |

FOREIGN PATENT DOCUMENTS

| | | |
|---|---|---|
| EP | 1521405 A1 | 4/2005 |
| EP | 1553737 A1 | 7/2005 |
| EP | 1732268 A1 | 12/2006 |
| EP | 1838039 A1 | 9/2007 |

OTHER PUBLICATIONS

WO 2006/136183 A1, PCT, Wei Zhao, Publication date Dec. 28, 2006, pp. 1-22.*
Vahe Balabanian et al., Digital Storage of Media-Command and Control Protocol Applied to ATM, IEEE Journal on Selected Areas in Communications, vol. 14, No. 6, Aug. 1996, pp. 1162-1172.
International Search Report from corresponding application PCT/IB2008/050788, pp. 1-4, Sep. 24, 2008.
Jian Pu et al., SLA Admission Controller for Reliable MPLS Networks, Conference on Applied Informatics, Innsbruck, Austria, Feb. 10-13, 2003, pp. 1-6.
R. Braden et al., Resource ReSerVation Protocol (RSVP) Network Working Group, RFC 2205, Sep. 1997, pp. 1-112.

* cited by examiner

*Primary Examiner* — Haresh N Patel

(57) ABSTRACT

Systems and methods according to these exemplary embodiments provide for methods and systems for negotiating resources in a communication system. One exemplary method includes transmitting, by a service manager, a request for a service, wherein the service request either explicitly provides, or implicitly refers to, a list of a plurality of service options for providing the service. Additionally, a resource manage can receive the transmission request from a service manager and process the request based upon either the explicitly transmitted list of service options or the reference to a list of service options.

34 Claims, 9 Drawing Sheets

FIG_4

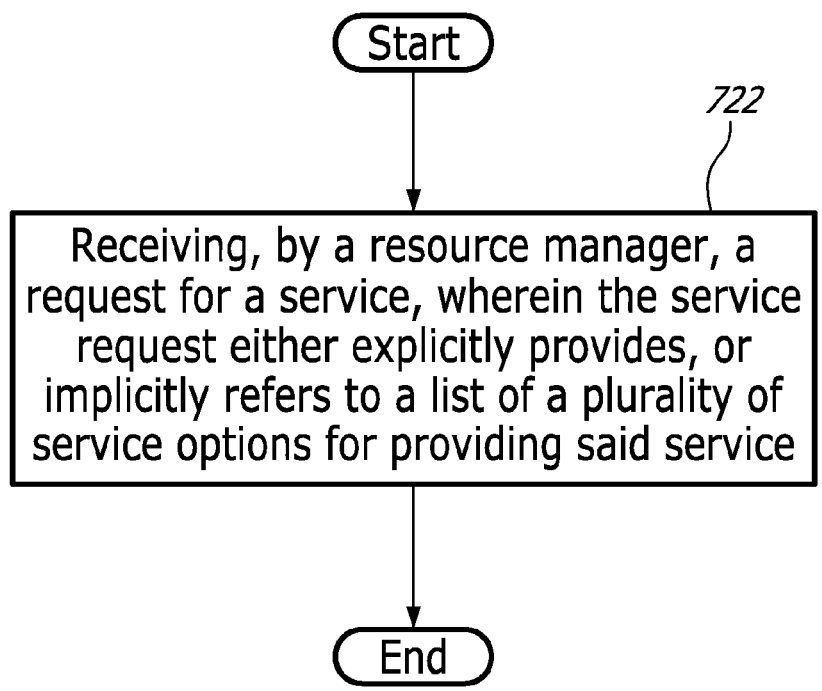

NETWORK RESOURCE NEGOTIATION BETWEEN A SERVICE PROVIDER NETWORK AND AN ACCESS NETWORK

TECHNICAL FIELD

The present invention relates generally to telecommunications systems, and in particular to methods and systems for delivering services over a network.

BACKGROUND

As the consumer electronics industry continues to mature, and the capabilities of processors increase, more devices have become available for public use that allow for the transfer of data between devices and more applications have become available that operate based on this transferred data. Of particular note are the Internet and local area networks (LANs). These two innovations allow multiple users and multiple devices to communicate and exchange data between different devices and device types. With the advent of these devices and capabilities, users increasingly desire to receive a variety of services over these networks. Some common examples of these services (or applications) are video on demand (VoD), Internet Protocol television (IPTV) and audio files. Additionally, many of these services can be received at different service quality levels, e.g., in different formats and based upon a variety of parameters. Some of these parameters include, for example, the user's output device capabilities, available bandwidth, service agreements and network resource availability.

Methods currently exist to allow a user to ask for and receive a service over a network. A basic system describing exemplary elements which can be involved in such communications will now be described with respect to FIG. 1. These elements include an end user 102, a resource manager (RM) 104, a service manager (SM) 106, an application function (AF) 108, and a network 110. These components are typically able to communicate with each other over network 110, however most of the control functions regarding network resources are performed by the RM 104 while most of the control functions regarding service policies and sessions are performed by the SM 106. End user 102 interacts with a device (not shown), such as a computer with display, a television, an audio device or the like, used for disseminating the application sent by AF 108. Additionally, while network 110 is illustrated in FIG. 1 as being a single network in many working examples there are a number of different networks that are interconnected with one another.

Additionally, it is common for application and network services offered over a public access network to be provided and supported by a number of different operational entities or organizations. These organizations will play one or many business roles, and will also be part of one or several corporate entities. For example, there can be competing program distributors or a single company offering phone services, standard television programs and VoD movies. Thus it is easy to see how an end user could desire to interact with a variety of applications provided by different service providers through a multitude of networks, where the network resources could be shared at various times. One tool used to assist in defining what an end user can access over these networks from various service providers is a Service Level Agreement (SLA).

The relationship between the end user and the service provider is typically regulated through a specific agreement. The SLA is a contract between the end user and the service provider that defines a set of characteristics of the service delivery. This includes general technical aspects, such as bandwidth and availability of the services the user is authorized to access, and non-technical aspects, such as pricing, penalties or verifying methods. This relationship is generally established prior to an end user requesting a service from the AF.

After the details of a SLA are put into a format that the SM can understand, e.g., a program or database, an end user can request services. A currently existing message sequence for a service request, and resource negotiation associated therewith, will now be described with respect to FIG. 2. Initially, end user 202 sends a message 210 indicating the desire for a service to an AF 208. AF 208 then transmits a message 211 to SM 206 which allows the SM to initially verify that the end user 202 should be allowed access to that application. If the end user 202 is allowed access to the desired application, SM 206 then sends a message 212, based on the request and details of any SLA(s) involved, to RM 204. Message 212 contains a quality of service (QoS) request and other pertinent details regarding the request.

In this example, RM 204 is unable to provide the desired QoS, e.g., due to insufficient network resources being currently available, and sends a message 214 to SM 206 denying the request. SM 206 then sends another message 216 to RM 204 containing a lower QoS request for the same application. RM 204 again rejects the request and notifies SM 206 in message 218. This iterative process continues until SM 206 sends a message 220 with a request that RM 204 can grant. This acceptance message 222 is then sent from RM 204 to SM 206. At this point, SM 206 sends a message 224 to AF 208 which allows AF 208 to send the application 226 to end user 202. Application (service) 226 is sent to end user 202 based upon the allowable criteria and resources as designated by RM 204. It will be appreciated by those skilled in the art that this iterative method for resource negotiation may consume unnecessary bandwidth and introduce significant delay in the delivery of the service through the communication network.

Accordingly the exemplary embodiments described herein address the need for improving the messaging between a SM and a RM and the delivery of applications to an end user.

SUMMARY

According to one exemplary embodiment a method for negotiating resources in a communication system includes transmitting, by a service manager, a request for a service, wherein the service request either explicitly provides, or implicitly refers to, a list of a plurality of service options for providing the service.

According to another exemplary embodiment a method for negotiating resources in a communication system includes receiving, by a resource manager, a request for a service, wherein the service request either explicitly provides, or implicitly refers to, a list of a plurality of service options for providing the service.

According to yet another exemplary embodiment a communications node for negotiating resources in a communication system includes a processor for transmitting a request for a service, wherein the service request either explicitly provides, or implicitly refers to, a list of a plurality of service options for providing the service.

According to yet another exemplary embodiment a communications node for negotiating resources in a communication system includes a processor for receiving a request for a service, wherein the service request either explicitly, or implicitly refers to, a list of a plurality of service options for providing the service.

BRIEF DESCRIPTION OF THE DRAWINGS

The accompanying drawings illustrate exemplary embodiments of the present invention, wherein:

FIGS. 7(a)-7(c) contain flowcharts depicting communications methods and processes used by service managers and resource managers according to exemplary embodiments.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
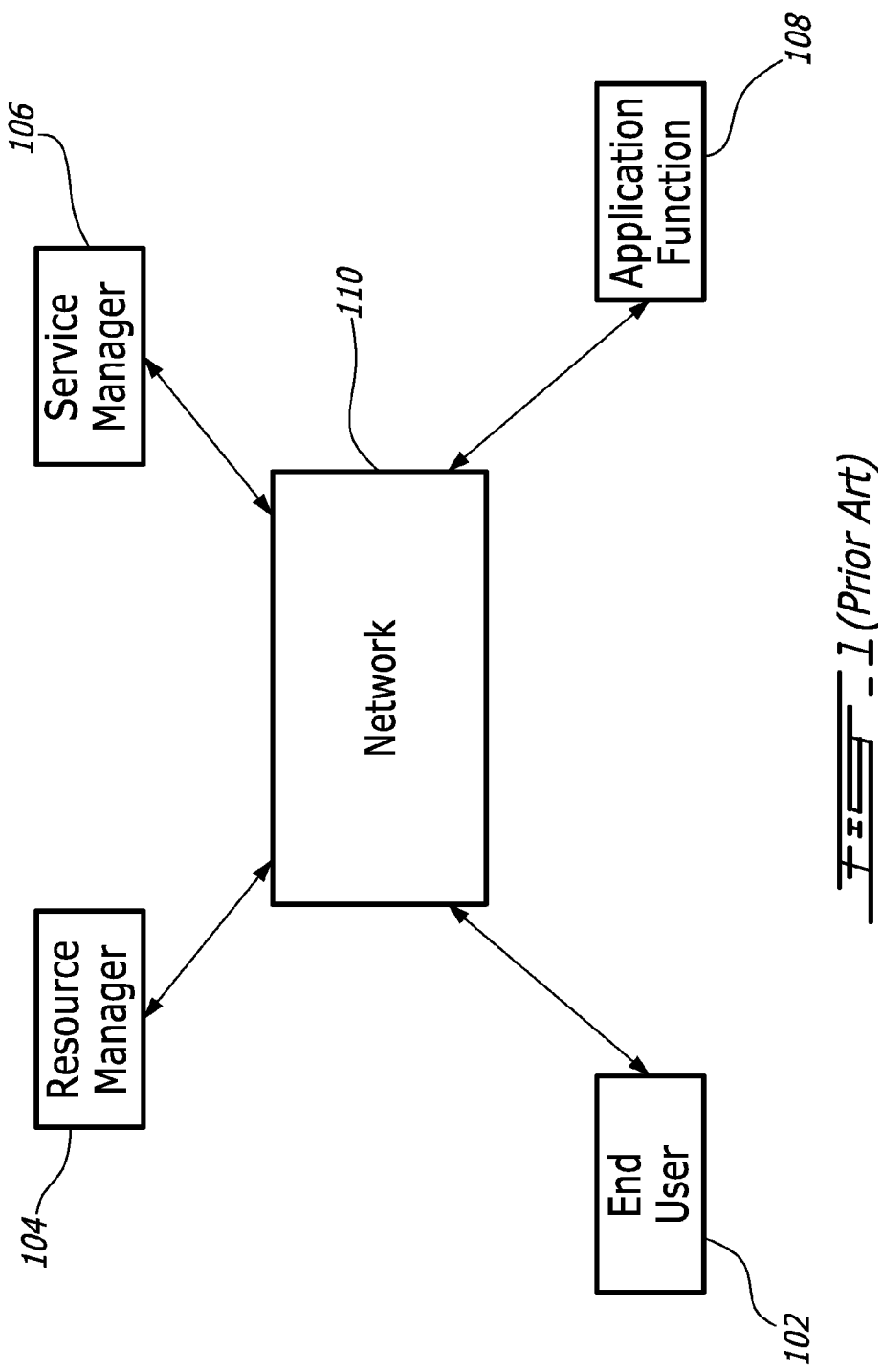
FIG. 1 illustrates components in a communication network used for delivering an application to an end user.
Figure 2:
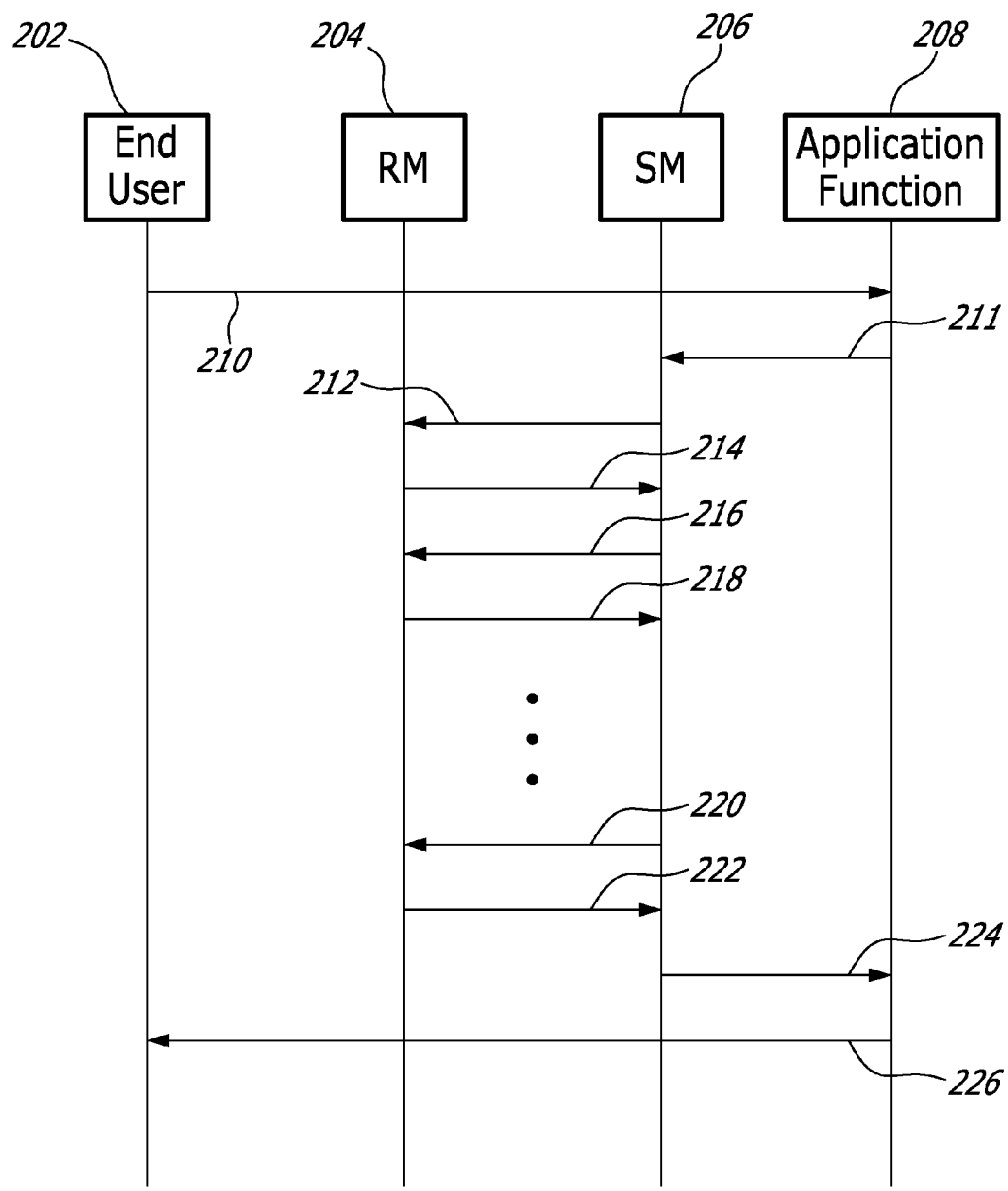
FIG. 2 illustrates a series of messages sent between nodes for delivering an application to an end user.
Figure 3:
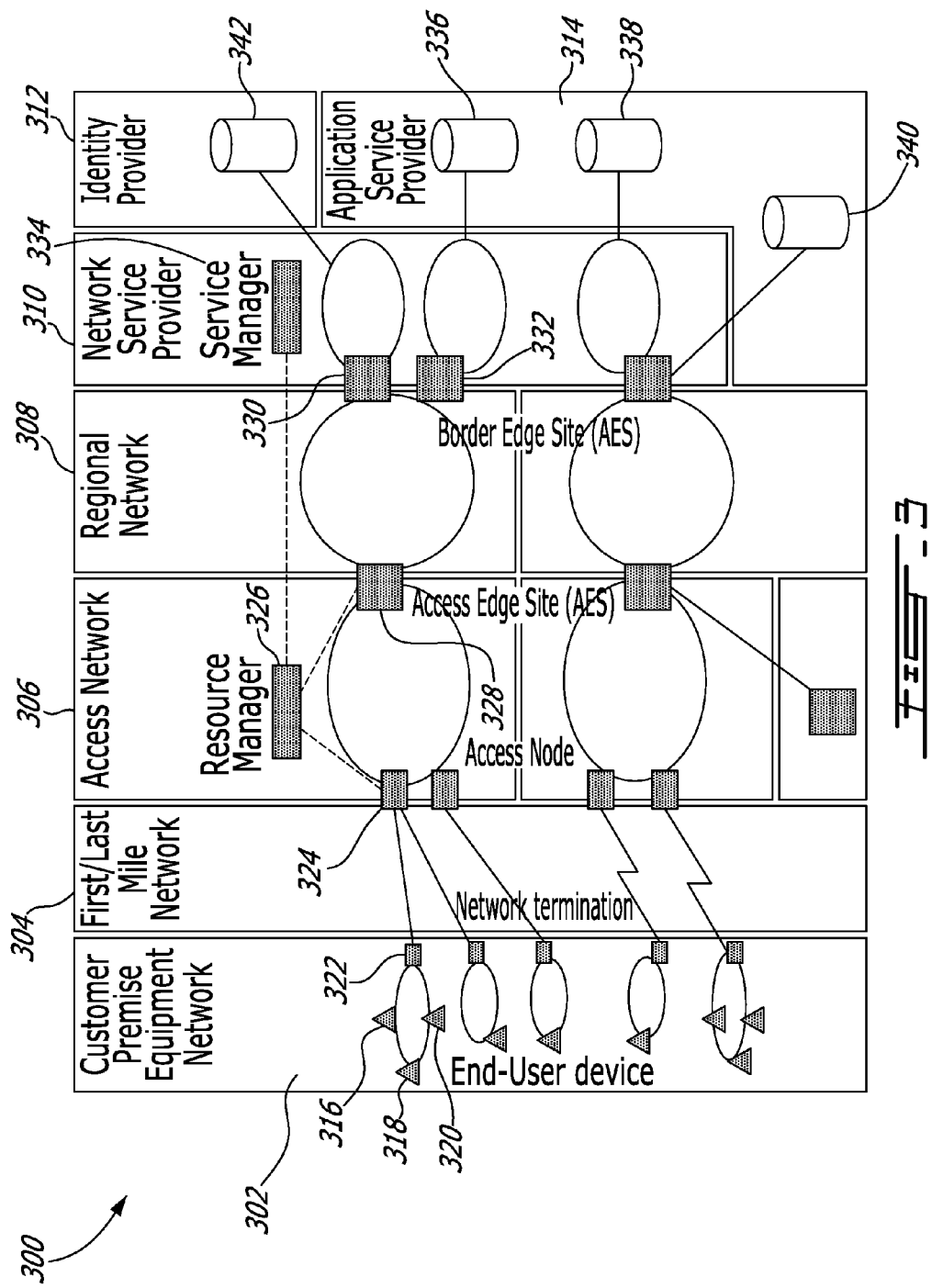
FIG. 3 illustrates components in a communications network used for delivering an application to an end user according to exemplary embodiments.

Ideally, an end user should be able access a multitude of applications and service providers through a single access point. For example, a user may want to watch a TV show on one television, record a movie for future use on a recorder, and have streaming audio playing in another room all of which are preferably provided via a single access point. To implement these requests from an end user, numerous messages and components interact. In order to provide some context for a discussion of exemplary resource negotiation according to these exemplary embodiments, an exemplary communications network will first be described with respect to FIG. 3.

Therein, the grouping of interconnected networks 300, can be broken down into a customer premise equipment network 302, a first/last mile network 304, an access network 306, a regional network 308, a service provider network 310, an identity provider 312 and application service providers 314. The customer premise equipment network 302 contains networked home equipment such as a computer 316, laptop 318, TV 320 and residential gateway 322. Residential gateway 322 could be a router or any other connection from the home to an outside network. First/last mile network 304 contains the various connections and equipments used (not shown) to provide communications from residential gateway 322 in the customer premise network 302 to access node 324 in the access network 306. Access network 306 contains access node 324, access edge site (AES) 328 and resource manager (RM) 326 which runs on a server (not shown). AES 328 is in communication with nodes in both access network 306 and regional network 308. Regional network 308 also contains border edge sites (BES) 330, 332 which could also be part of service provider network 310. Service provider network 310 also contains the service manager (SM) 334 which runs on a server (not shown). Additionally, servers (or application functions (AFs)) 336, 338, 340 associated with the application service providers 314 and server 342 associated with the identity provider 312 are able to communicate with elements within the service provider network 310. These exemplary components are used for communication, control and delivery of a service to an end user. However, it will be understood that there can be more or fewer components used than described above, such as more service providers having more applications running on more servers and/or more routers in the communications path. Additionally a server could support multiple application functions.

The functional elements of primary interest in the exemplary system described above are the RM 326, the SM 334 and an AF 336. Some of the interactions between the AF 336, SM 334 and RM 326 include signaling used to support the following set of functions: (1) functions to publish, discover, subscribe, invoke, and deliver Quality of Service (QoS) enabled services; (2) functions for admission control based on service and network policy control; (3) functions to provide services offered by different service providers with specific functions to reserve resources in the access network and the adjacent networks; (4) functions for resource reservation and admission control across multiple administrative domains; (5) functions associated with policy-pull and policy-push QoS scenarios; (6) functions associated with guaranteed, regulated and best-effort Network Service Classes (NSCs); (7) functions associated with export of charging information and QoS metrics for monitoring purposes; and (8) functions associated with different underlying access and core network technologies.

The AF 336 is the network entity which is responsible for delivering the service to the end user. Thus the AF 336 is the entity that knows the type and quantity of resources required to deliver the service to the end user. Examples of an AF 336 are video streamers, voice over IP (VoIP) gateways and other media servers. Before delivering the service, the AF 336 requests authorization from the SM 334.

The SM 334 coordinates the publishing and offering of QoS enabled services through the registry. The SM 334 can be viewed as a container in which different published services are controlled. Furthermore, the SM 334 interacts with the user portal and the AF 336 (e.g. a media server) to process service requests based on specific policies. The interaction may be through an intra- or inter-domain interface. The SM 334 is also able to serve more than one user portal and AF 336. However, on a service session basis, the user portal and AF 336 typically interact with only one SM 334. Additionally, the SM 334 verifies that the end user is entitled to receive the service it has requested and, if entitled, the SM 334 then requests the necessary resources from the RM 326.

According to exemplary embodiments, the SM 334 further communicates with the RM 326 through web services by sending eXtended Markup Language (XML) encoded simple object access protocol (SOAP) messages to its endpoints, and by receiving SOAP message responses. Due to different implementations of the possible business roles, the SM 334 may be located either in the same domain or in a different domain as the RM 326 with which it interacts. Therefore, the interface between the two entities should support both cases. The RM 326 is able to serve more than one SM 334, and one SM 334 may interact with a number of RMs 326, although on a service session basis, the SM 334 typically interacts with only one RM 326. Based on the Service Level Agreement (SLA) negotiated with the end user for a particular service, the SM 334 has the responsibility to send the session and media related information, in the form of a Service Level Specification (SLS), to the RM 326 for resource reservation and admission control purposes. SLAs and SLSs are discussed in more detail below. Upon successful reservation, the SM 334 may communicate with the AF 336 to synchronize information as necessary.

The RM 326 is responsible for reserving, admitting, allocating and monitoring network resources within a given domain based on specific SLS reservation requests received from a SM 334. Additionally, the RM 326 is accountable for managing inter-domain communication, with the other RMs 326 in neighboring domains, in order to coordinate SLSs across the domain boundaries as required. RMs 326 communicate with each other through web services by sending XML encoded SOAP messages to their endpoints, and by receiving SOAP message responses. For that purpose, the RM's interfaces are documented using Web Service Description Language (WSDL) and published in their respective registry. Neighboring domains cooperate to provide an end-to-end service when a delivery crosses boundaries between domains. Each domain relies on its neighboring domain to deliver its service traffic and, in turn, this neighboring domain passes the service traffic to its neighbors, etc., until reaching the final destination. Typically, one RM 326 exists per administrative domain. Besides serving SLS reservation requests, the RM 326 also performs admission control based on local authorization policies, sets layer 2 and layer 7 policies in network elements to properly configure the network, and monitors the state of resources within its domain including the edges of its domain (i.e., nodes connected to and from adjacent networks).

Once the RM 326 has received an SLS through a reservation request, it is recursively split into several single-domain SLS instances, one for each neighboring domain. The RM 326 can support two-phase and single-phase resource reservation. In the two-phase case, necessary resources are first reserved, which reservation only ensures that resources are available. When the reservation later is committed with a separate message, the resource can then be configured in the network. This two-phase reservation technique is mainly used for managing inter-domain reservation requests. Single phase resource allocation can be used whenever all parameters are known at the time the reservation request is made. Additionally, it is possible to request a modification to an existing reservation.

Figure 4:
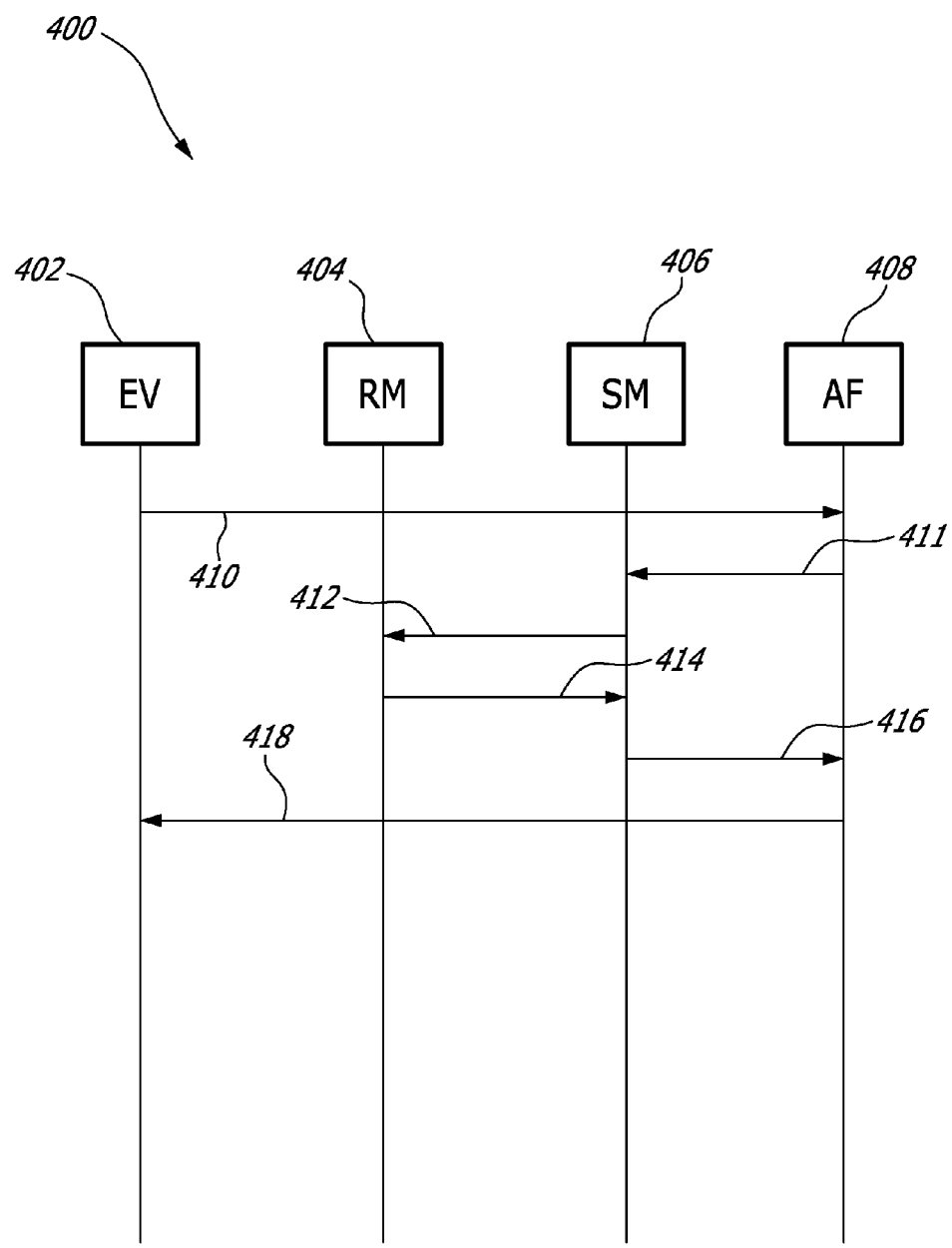
FIG. 4 shows a series of messages sent between nodes for delivering an application to an end user according to exemplary embodiments.

The above described components used in communication networks are capable of transmitting, receiving and forwarding a variety of message types. Messages of particular interest in the instant application are messages relating to negotiating the resources to be used to provide an application (service) to an end user. According to exemplary embodiments the quantity of messages sent back and forth between a SM 334 and a RM 326 can be significantly reduced as compared to currently used methods. A communication sequence 400 according to exemplary embodiments will now be described as shown in FIG. 4.

Therein, an end user 402 transmits a message 410 indicating a requested service to AF 408. AF 408 then transmits a message 411 to SM 406 which allows the SM 406 to initially verify that the end user 402 should be allowed to access that application. If the end user 402 is allowed access to the desired application, SM 406 then sends a message 412, based on the request and details of any current SLAs involved, to RM 404. According to this exemplary embodiment message 412 contains a ranked list describing the QoS request options and other pertinent details regarding the request. For example, the message 412 can indicate a preference order for the various manners in which the requested service can be delivered. Examples of this message 412 are discussed in more detail below with respect to FIG. 5.

Having received the service request message, RM 404 then determines the highest level of service (or highest ranked service option in the ranked list) with which the desired application can be provided to the end user based upon currently available network resources and, possibly, other factors. The RM 404 then transmits this acceptance information including a reservation token and selected level of service to SM 406 in message 414. SM 406 then transmits message 416 to the AF 408 which allows AF 408 to send the desired application 418 to end user 402 using the negotiated level of service. This process significantly reduces the potential number of messages transmitted between the SM 406 and the RM 404 by providing a ranked service option list in message 412 which indicates in the first instance how the SM 406 would negotiate the service level if its first, second, third, etc. choice of service options is not available. Thus instead of, potentially, multiple negotiation messages being exchanged between the SM and RM for each possible service level option at which a particular application (service) could be provided, a single exchange of messages can be employed.

Figure 5:
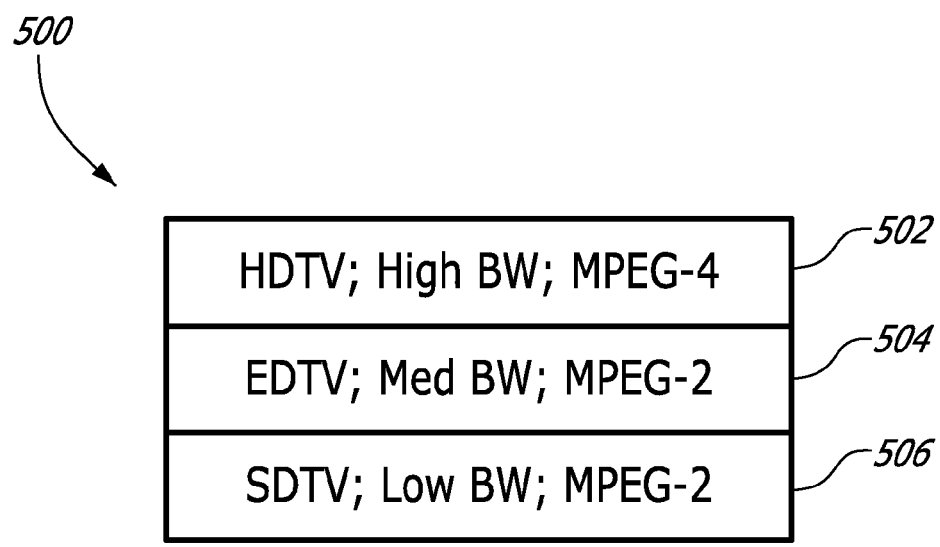
FIG. 5 depicts a ranked list of service options according to exemplary embodiments.

As mentioned above, according to one exemplary embodiment, a message from a SM 406 to a RM 404 contains a ranked list of QoS options as well as, for example, end-user device address information and AF 408 address information. For example, the SM 406 could send a message containing an end-user device address, the AF 408 address, the service identifier "James Bond" and a ranked list of QoS options. The purely illustrative ranked list 500, depicted in FIG. 5, contains three service options shown by row and listed in order of preference. Each service option contains a set of parameters: a display format, a bandwidth field and a codec field, respectively. Option_1 502 is the option most desired by, e.g., the end user, with Option_3 506 being the least desired option for the manner in which the movie "James Bond" should be delivered. Option_1 502 parameters include High Definition TV (HDTV), high bandwidth, and Motion Picture Experts Group (MPEG) 4. Option_2 504 parameters include Enhanced Definition TV (EDTV), medium bandwidth, and MPEG-2. Option_3 506 parameters include Standard Definition TV (SDTV), low bandwidth, and MPEG-2. As described earlier, the RM 404 takes these specific service request options in each ranked list and matches them to the available resources to determine which is the highest ranked option that can currently be supported by the network. It is to be understood that the parameters used in the ranked list shown in FIG. 5 are simply illustrative of some of the parameters which are potentially available to be used, other information can be included in the message 412 sent from the SM 406 to the RM 404. Moreover, the list 500 can include explicit ranking information, e.g., numbered fields, rather than being organized in order by preference.

According to another exemplary embodiment, the ranked listing is not explicitly transmitted in the message 412, but is instead stored in the RM 404, e.g., in a memory device associated therewith, prior to being used. In this case, the SM 406 sends a message to the RM 404 containing, for example, the desired service identifier and an end-user device address information (or other appropriate information for identifying the end point). Upon receipt of this message, the RM 404 accesses the earlier stored ranked list information relating to the specific end-user device address specified by the SM 406 and the desired service. This information is then matched to available network resources, from which the RM 404 decides at what QoS level the application will be sent to the end user. For example, suppose that a message is sent from a SM 406 to a RM 404 containing the movie desired, e.g., "James Bond", and end-user device address information. The RM 404 takes that information and retrieves a pre-stored, ranked service option list associated with the identified service. Each option in the pre-stored, ranked service option list (such as that illustrated in FIG. 5) can then be evaluated in order to determine which highest ranked entry can be used to provide the requested service, e.g., given the resources which are needed for each entry and the resources currently available.

Additional or alternative parameters to those described above can be used by the RM 404 for making this decision, such as previously known requests or scheduled hardware downtime. This information is then transmitted back to the SM 406, which continues the process for providing the application to the end user. Additionally, a RM 404 could have multiple lists pre-stored relating to a specific service which are accessed based upon the request message sent by a SM 406. Alternatively, both a list pre-stored in the RM 404 and a list sent in a message from the SM 406 can be used. In this latter case, the RM 404 could match the two lists and generate a new ranked list from which the QoS parameters for the requested application are selected.

According to yet another exemplary embodiment, the RM 404 is able to select from within this list of service options based, at least in part, on things other than user preference and available resources. For example, suppose that a SM 406 sends a resource request to a RM 404 and in the request there is code that is not understood by the RM 404. This scenario could occur if, for example, a SM 406 sends a list that is not in ranked order, or if the SM 406 requests a resource that the RM 404 is not familiar with, such as a request to use a type of codec that the RM 404 does not recognize. The RM 404 could then navigate within the list to find options of service that it understands and determine from that point in the list what level of service to provide based upon available network resources. As another example, suppose that a SM 406 sends a request message to a RM 404 which includes a parameter such as cost which is listed as having a higher priority than QoS. In this case the RM 404 could navigate the list until the best QoS available that meets the cost limitation is found.

Figure 6:
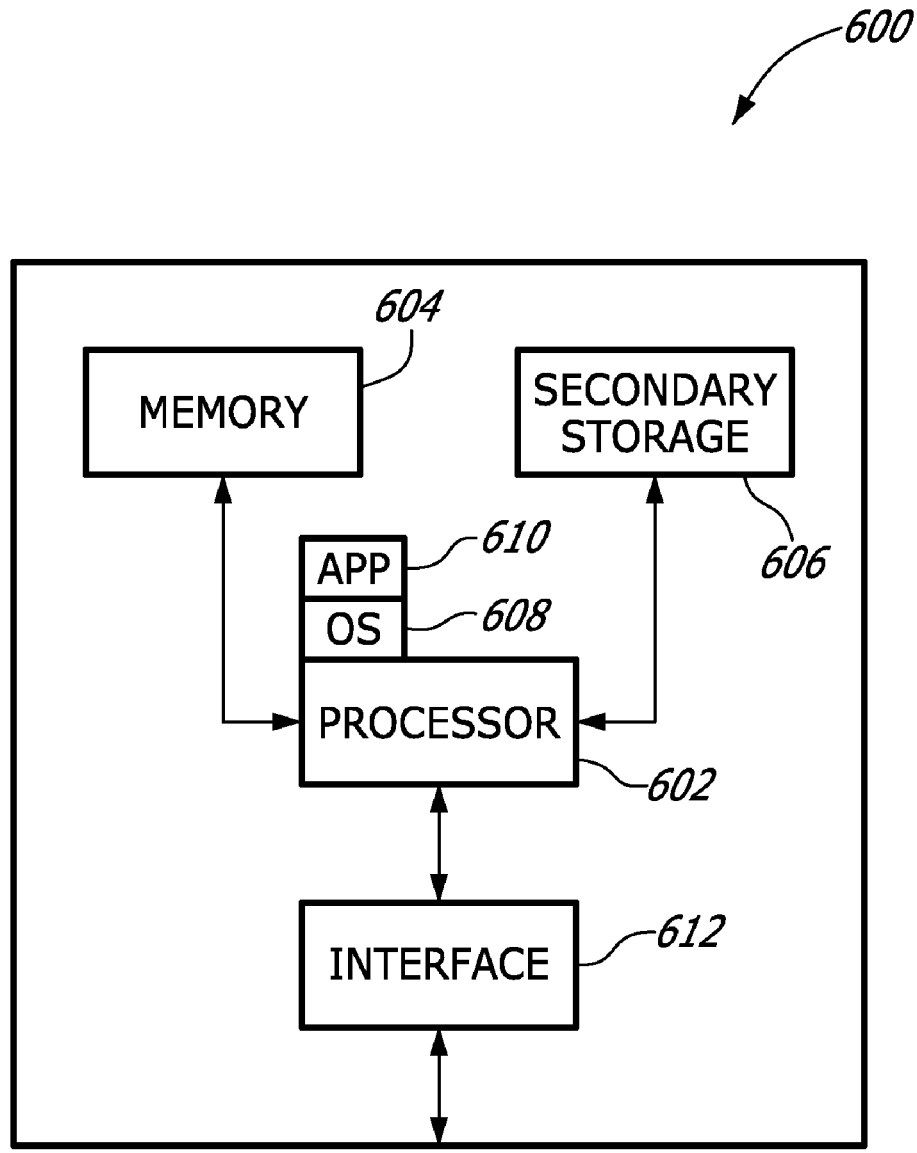
FIG. 6 depicts the components of a server according to exemplary embodiments.

The RM 404 and the SM 406 typically reside on separate servers which are often in different domains. For example, as shown generally in FIG. 6, such a server 600 can include a processor 602 (or multiple processor cores), memory 604, one or more secondary storage devices 606, an operating system 608 running on processor 602 and using the memory 604, as well as a corresponding application 610, e.g., a resource management program for the RM 404 server and a service manager program for the SM 406 server. An interface unit 612 may be provided to facilitate communications between the server 600 and the rest of the network(s) or may be integrated into the processor 602. Additionally, routers and network nodes can have the same or similar components for themselves that have been described for a server 600. Thus a server, or network node, according to an exemplary embodiment may include a processor for transmitting and receiving messages associated with supplying an application (service) to an end user. For example, from the perspective of the SM 406, a communication node can include a processor for transmitting a request for a service, wherein the service request either explicitly provides, or implicitly refers to, a list of a plurality of service options for providing the service. As another example, from the perspective of the RM 404, a communication node can include a processor for receiving a request for a service, wherein the service request either explicitly provides, or implicitly refers to, a list of a plurality of service options for providing the service.

Depending upon the type of service requested by an end user, the service can be provided either as a unicast message stream or a multicast message stream. For example, if an end user had requested and received approval for a service, such as a James Bond movie, as a part of a video on demand (VoD) service the message would be sent out as a unicast message stream since only the end user would be watching that movie at this specific time with his or her specific control options, such as, play, pause or fast forward. Since this application needs to be unique to the end user, sending it out as a unicast message is appropriate. As another example consider an end user that requests a regularly scheduled TV program that is currently being broadcasted to a plurality of end users. This TV program is only broadcast at a specific time and is sent to a plurality of end users, therefore the application is sent out as a multicast stream. Resource allocation messaging between a SM 406 and a RM 404 according to these exemplary embodiments may vary depending upon whether a service associated with unicast or multicast signaling is being requested. Some detailed, yet purely illustrative embodiments for unicast and multicast resource reservations are described below.

Exemplary Unicast Resource Negotiation Messaging

Exemplary messages and operations used regarding the delivery of an application or service via unicast, such as VoD, to an end user are described herein relative to the communications between a SM 406 and a RM 404. These operations include, for example, an allocate resource operation, a modify resource operation and a free resource operation.

The allocate resource operation is used by the SM 406 when new resources are required, e.g., in the context of message 412 described above. In this message the SM 406 requests the RM 404 to allocate resources between a source (end user device) Internet Protocol (IP) address and a destination (AF) IP address. The allocate resource operation in this purely illustrative example contains an input structure called "allocateResourceRequest" and an output structure called "allocateResourceResponse".

According to this exemplary embodiment, the "allocateResourceRequest" message is used to convey information from the SM 406 to the RM 404 regarding the application an end user desires to access. In this example, the "allocateResourceRequest" structure contains a "resId" parameter and a "sls" parameter. Additionally, when resources are allocated, they can be referenced by a resource identifier which is globally unique. The "resId" parameter is an optional parameter string representing this resource identifier. If "resId" is present, the resources associated with this request will be identified by the value specified with the "resId". If it is not present, the RM 404 will generate a unique resource identifier and will return it in the response to the SM 406. The "sls" parameter is described below as an XML encoded string describing the parameters of the actual required resources according to this example as follows:

```
<?xml encoding="UTF-8"?>
<!ELEMENT sls (FullResponse?, SourceAddr, DestinationAddr,
    UnicastSelections)>
<!-- The <FullResponse> value should be 0 or 1 -->
<!ELEMENT FullResponse (#PCDATA)>
<!ELEMENT UnicastSelections (Media+)>
<!ELEMENT Media SourceAddr, DestinationAddr>
<!ATTLIST Media nsc NMTOKEN #REQUIRED
    downstream NMTOKEN #IMPLIED
    upstream NMTOKEN #IMPLIED>
<!ELEMENT SourceAddr (#PCDATA)>
<!ELEMENT DestinationAddr (#PCDATA)>
```

The "FullResponse" field above indicates to the RM 404 that the SM 406 requires the full description of the selected resources in the response rather than just the index of the resources. The "nsc" parameter is preferably correlated with the RM 404 configuration data. Within the RM 404, one "nsc" value is converted to a specific priority and a specific QoS. The "SourceAddr" and "DestinationAddr" values are in the format vr,IPAddress where "vr" is the IP domain in which the IP address is allocated. "SourceAddr" is the IP address of the end user device. "DestinationAddr" is the IP address of the AF server. The "SourceAddr" and "DestinationAddr" pair may be different in each media as the different classes of service may be delivered by different servers. The "upstream" and "downstream" parameters represent the quantity of bandwidth requested for that media which values can, for example, be specified in kilobits per second. At least one of the two parameters are typically present, however both can appear in the media description.

In this example, the RM 404 will try each <Media> entry in the sequence they appear in the request by matching the request to available resources. The resources associated with the first successful <Media> will then be reserved and returned in the response to the SM 406. It is to be understood that the above described encoding of the request could be any of a variety of formats such as Abstract Syntax Notation one (ASN.1) or Type Length Value (TLV). The above shown message describes an exemplary embodiment where the set of network service classes is pre-established between the SM 406 and the RM 404, i.e., the preferred service option list is not explicitly transmitted in the "allocateResourceRequest" message. In an alternative exemplary embodiment the SM 406 can provide a ranked list of the network service classes to the RM 404 directly in the "allocateResourceRequest" message.

In response to an "allocateResourceRequest" message, an RM 406 may transmit an "allocateResourceResponse" message. The "allocateResourceResponse" structure according to this exemplary embodiment contains a "done" parameter, a "resId" parameter and a "slsResponse" parameter. The "done" parameter provides the status of the resource allocation operation. A value of "−1" indicates an error, a value of "0" indicates the resources are currently not available, and a value of "1" indicates resources were allocated for this request. The "resId" parameter provides the resource identifier associated with the allocated resources and may only be provided when the "done" parameter is returned with a value of "1". Additionally this "resId" parameter can be used in a subsequent message to update or free resources. The "slsResponse" parameter is an XML encoded string representing the actual resources allocated in the case where the tag <FullResponse> is present in the "sls" string of the "allocateResourceRequest" structure and its value is "1". The format of the "slsResponse" string according to this example is governed by the following Document Type Definition (DTD):

```
<?xml encoding="UTF-8"?>
<!ELEMENT sls UnicastSelections>
<!ELEMENT UnicastSelections (Media)>
<!ELEMENT Media SourceAddr, DestinationAddr >
<!ATTLIST Media nsc NMTOKEN #REQUIRED
    downstream NMTOKEN #IMPLIED
    upstream NMTOKEN #IMPLIED>
<!ELEMENT SourceAddr (#PCDATA)>
<!ELEMENT DestinationAddr (#PCDATA)>
```

The definitions of the fields used in the above XML string can be the same definitions as used above in the "allocateResourceRequest" message for this purely illustrative message.

Exemplary embodiments are not limited to messaging associated with the initial allocation of resources, but can also be used in messaging associated with follow-on resource negotiation to reduce the amount of signaling associated herewith. For example, another exemplary operation, modifyResource, is used by the AF(s) when modifications to previously allocated resources are desired or required. According to this purely illustrative example, the modifyResource operation contains an input structure "modifyResourceRequest" and an output structure "modifyResourceResponse". The "modifyResourceRequest" structure contains a "resId" parameter and a "sls" parameter. The "resId" parameter is a string representing the resource identifier associated with previously allocated resources and the "sls" parameter is a XML encoded string describing the modification to the existing resources. The format of the "sls" string according to this example is governed by the following DTD:

```
<?xml encoding="UTF-8"?>
<!ELEMENT sls (UnicastSelections)>
<!ELEMENT UnicastSelections (Media+)>
<!-- The "nsc" attribute should be coordinated with the values used
by the Resource Manager internally
The format for "downstream" and "upstream" is an integer optionally
followed by M or G. If neither M or G is present, then the value specifies
kilobits/sec.
M is for megabits/sec
G is for gigabit/sec
e.g. 200   12M   1G
Within unicastSelections, you may define "downstream" or
"upstream" or both. At least one must be present.
-->
<!ELEMENT Media EMPTY>
<!ATTLIST Media nsc NMTOKEN #REQUIRED
    downstream NMTOKEN #IMPLIED
    upstream NMTOKEN #IMPLIED>
```

The definitions of the fields used in the above XML string can be the same definitions used above in the "allocateResourceRequest" message.

In response to a "modifyResourceRequest" message, a RM 404 may transmit a "modifyResourceRequest message. The "modifyResourceResponse" structure contains according to this exemplary embodiment a "done" parameter and a "slsResponse" parameter. The "done" parameter provides the status of the resource allocation operation. A value of "−1" indicates an error, a value of "0" indicates that the resources are currently not available and a value of "1" indicates that the resources were modified. The "slsResponse" parameter is an XML encoded string representing the actual resources modified in the case when the tag <FullResponse> is present in the "sls" string of the "modifyResourceRequest" structure and its value is "1". The format of the "slsResponse" string is according to this example governed by the following DTD:

```
<?xml encoding="UTF-8"?>
<!ELEMENT sls (UnicastSelections)>
<!ELEMENT UnicastSelections (Media)>
<!-- The "nsc" attribute should be coordinated with the values used
by the Resource Manager internally
The format for "downstream" and "upstream" is an integer
optionally followed by M or G. If neither M or G is present, then the value
specifies kilobits/sec.
M is for megabits/sec
```

-continued

```
G is for gigabit/sec
e.g. 200  12M  1G
Within UnicastSelections, one may define "downstream" or
"upstream" or both. At least one is typically present.
-->
<!ELEMENT Media EMPTY>
<!ATTLIST Media nsc NMTOKEN #REQUIRED
    downstream NMTOKEN #IMPLIED
    upstream NMTOKEN #IMPLIED>
```

The definitions of the fields used in the above XML string can be the same definitions used above in the "allocateResourceRequest" message.

Yet another exemplary resource communication which can be implemented using these exemplary techniques is a release communication. For example, the freeresource operation is used by the AFs when previously allocated resources are no more required. The freeresource operation only contains an input structure called "freeResourceRequest". The "freeResourceRequest" structure only contains the resource identifier "resId" of the resources which need to be freed.

Exemplary Multicast Resource Negotiation Messaging

According to another exemplary embodiment, messages and operations used for the delivery of an application via multicast, such as PayPerView, to an end user are described herein relative to the communications between a SM 406 and a RM 404. Like the foregoing unicast embodiment, these operations can, for example, include an allocate resource operation, a modify resource operation and a free resource operation.

The allocate resource operation is used by the SM 406 when new resources are required in the context of message 412 described above. In this message the SM 406 requests the RM 404 to allocate resources between a source (end-user device) Internet Protocol (IP) address and a destination (AF) IP address. The allocate resource operation in this purely illustrative example contains an input structure called "allocateResourceRequest" and an output structure called "allocateResourceResponse".

According to this exemplary embodiment, the "allocateResourceRequest" message is used to convey information from the SM 406 to the RM 404 regarding the application an end user desires to access. In this example, the "allocateResourceRequest" structure contains a "resId" parameter and a "sls" parameter. Additionally, when resources are allocated, they can be referenced by a resource identifier which is globally unique. The "resId" parameter is an optional parameter string representing this resource identifier. If it is present, the resources associated with this request will be identified by the valued specified with the "resId". If it is not present, the RM 404 will generate a unique resource identifier and will return it in the response to the SM 406. The "sls" parameter is described below as an XML encoded string describing the parameters of the actual required resources according to this example as follows:

```
<?xml encoding="UTF-8"?>
<!ELEMENT sis (FullResponse?,SourceAddr,DestinationAddr,
MulticastSelections)>
    <!-- The <FullResponse> value should be 0 or 1 -->
    <!ELEMENT FullResponse (#PCDATA)>
    <!ELEMENT Address-Realm>
    <!ATTLIST Address-Realm vno NMTOKEN #REQUIRED >
    <!ELEMENT MulticastSelections (Multicast-Group+)>
    <!ATTLIST MulticastSelections uip NMTOKEN #REQUIRED>
    <!ELEMENT Multicast-Group >
    <!ATTLIST Multicast-Group
        addr NMTOKEN #REQUIRED
        server NMTOKEN #REQUIRED
        nsc NMTOKEN #REQUIRED
        downstream NMTOKEN #REQUIRED >
```

The "FullResponse" field above indicates to the RM 404 that the SM 406 requires the full description of the selected resources in the response rather than just the index of the resources. The "vno" parameter specifies the domain to which the IP addresses specified in the SLS belongs. The "uip" parameter specifies the IP address of the user device for which the negotiation is done. The "addr" parameter specifies the IP address for the multicast group. The "server" parameter indicates the source of the multicast stream. The "nsc" parameter is preferably correlated with the RM 404 configuration data. Within the RM 404, one "nsc" value is converted to a specific priority and a specific QoS. The "downstream" parameter specifies the required bandwidth for the multicast stream with the values which can, for example, be listed in kilobits per second. In this example, the RM 404 will try each <Multicast-Group> entry in the sequence, or ranked list, as they appear in the request. The resources associated with the first successful <Multicast-Group> will be reserved and returned in the response to the SM 406.

In response to the "allocateResourceRequest" message, a RM 404 may transmit an "allocateResourceResponse" message. The "allocateResourceResponse" structure according to this exemplary embodiment contains a "done" parameter, a "resId" parameter and a "slsResponse" parameter. The "done" parameter provides the status of the resource allocation operation. A value of "−1" indicates an error, a value of "0" indicates the resources are currently not available and a value of "1" indicates that the resources were allocated for this request. The "resId" parameter provides the resource identifier associated with the allocated resources. It is typically provided when the "done" parameter is returned with a value of "1". Additionally, this "resId" parameter can be used later on to update or free resources. The "slsResponse" parameter is an XML encoded string representing the actual resources allocated in the case where the tag <FullResponse> is present in the "sls" string of the "allocateResourceRequest" structure and its value is "1". The format of the "slsResponse" string is according to this example governed by the following DTD:

```
<?xml encoding="UTF-8"?>
<!ELEMENT sls MulticastSelections>
<!ELEMENT MulticastSelections (Multicast-Group)>
<!ELEMENT Multicast-Group >
<!ATTLIST Multicast-Group
    addr NMTOKEN #REQUIRED
    server NMTOKEN #REQUIRED
    nsc NMTOKEN #REQUIRED
    downstream NMTOKEN #REQUIRED >
```

The definitions of the fields can be the same as in the "allocateResourceRequest" message (for Multicast). Additionally, only one Multicast-Group can typically be used in this response.

Service Level Specification (SLS)

The above described exemplary messages are used between a SM 406 and a RM 404 to deliver the application or service to an end user in the "best" format possible with a reduced quantity of resource negotiation signaling. This "best" format possible is based upon, among other things, instructions from the SM 406 and resource availability as determined by the RM 404. In turn, these instructions from the SM 406 are based upon, among other things, the contents of a service level agreement (SLA) which has been converted into a SLS(s). While this process has been described briefly in various sections above, it will be described in more detail below.

According to exemplary embodiments, while SLAs are normally used for regulating network connectivity between providers, they may also be used to formalize retail negotiations. SLAs are signed upon subscription and are usually prepared from templates specially conceived for the requested service. The expectations of the end user about the service are specified in the SLA. To meet these expectations, the service provider plans the provisioning of resources for the requested service taking into account the agreement. However, the service provider typically has the final decision to accept an end user's QoS request in order to decide on how to manage the resources and apply their own QoS policies. In order to provide and deliver the service from an end-to-end perspective, appropriate mechanisms are required to be in place in each of the involved domains, i.e., the Access Domain and the Service Provider Domain. Depending on the type of service behavior that is to be achieved, one or more QoS features need to be implemented in these domains based on the SLA.

While the SLA represents a high level description of a required service, the SLS is a more formal technical document containing a list of technical parameters used for the provisioning and reservation of the necessary network resources. Furthermore, while SLA subscription can be considered as a relatively static process, SLSs are involved in a more dynamic process often due to variable network conditions. For example, for two different subscriptions related to the same service, different SLS instances can be derived according to the current network resource status. An SLS instance is instantiated through the resource reservation and admission control process, described above, which enables dynamic allocation of resources for the service, at the time the service is requested, and to release these resources, at the time the service is deactivated. This approach avoids the static over provisioning of guaranteed traffic and efficiently uses the deployed underlying network resources.

Additionally, these SLS requests and exchanges are typically conducted within the context of bilateral agreements already established between the providers. The concatenations of these bilateral agreements aid in the proper delivery of end-to-end QoS enabled services. The number of SLSs delivered to a RM 404 for negotiation purposes is independent of the number of domains along the path from the source to the destination. In fact, the SM 406 in charge of performing the translation of the SLA to one or more SLSs, is completely unaware of network details such as routing or topology.

According to exemplary embodiments, some aspects that can be included in the SLS include, but are not limited to: (1) traffic parameters for the service flow: Committed Information Rate (CIR), Peak Information Rate (PIR), packet length, etc; (2) QoS attributes for in-profile traffic (throughput, percentage of loss, maximum delay, jitter, etc.); (3) QoS attributes for out-of-profile traffic; (4) duration of the service (permanent, on demand, or scheduled in advanced); (5) service flows and their assigned NSC; (6) cost; (7) output device; (8) parental controls; (9) storage options; and (10) policies associated with the different flows of the service. These aspects are further coded into a form that a SM 406 can understand and use as required. Additionally, these aspects of a SLS can be incorporated into the message (either explicitly or implicitly) from a SM 406 to a RM 404 for requesting resources for a service or stored in the RM 404 for retrieval when the SM requests resources for an application to be delivered to an end user.

Figure 7A:
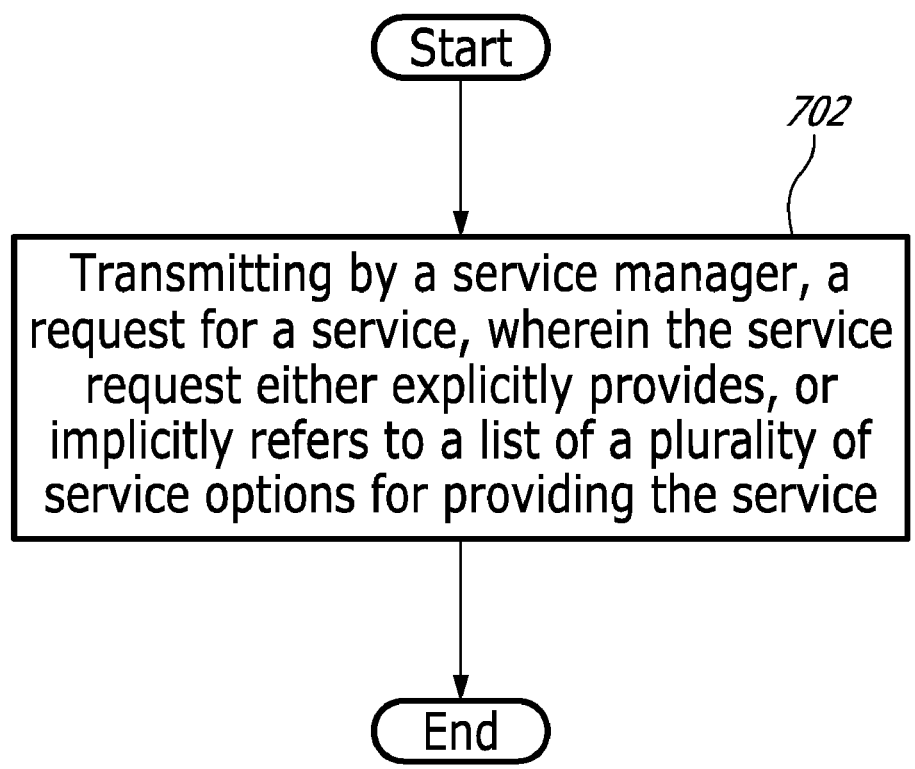
Figure 7B:
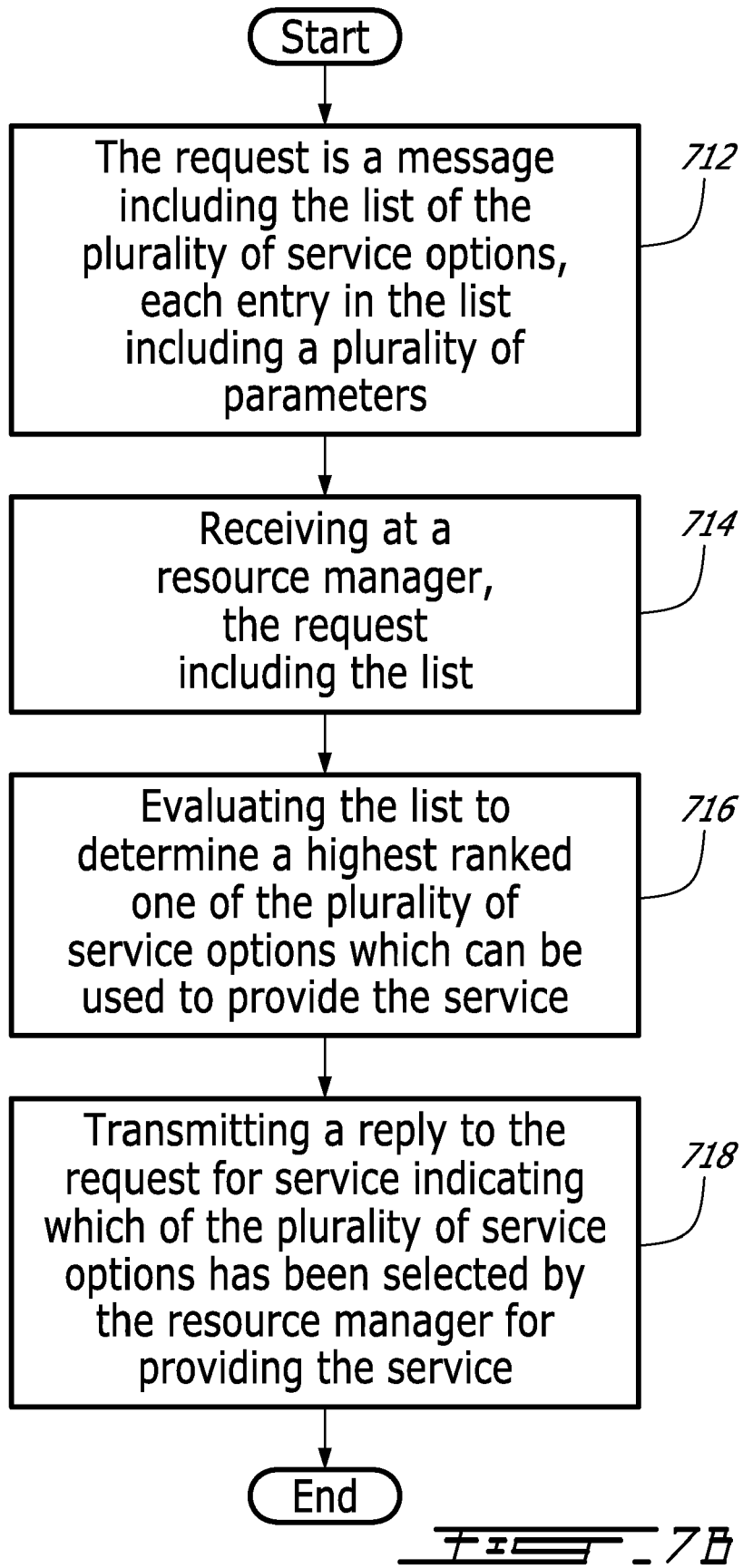

From the foregoing, it will be apparent that exemplary embodiments include methods for negotiating resources in a communication system, examples of which are illustrated in the flowcharts of FIGS. 7(a)-7(d). Therein, from a SM 406's perspective as shown in FIG. 7(a), a method for negotiating resources includes the step of transmitting by a SM, a request for a service, wherein the service request either explicitly provides, or implicitly refers to, a list of a plurality of service options for providing the service 702. Further, when the message includes an explicit service option as shown in FIG. 7(b), a negotiating method provides the request is a message including the list of the plurality of service options, each entry in the list including a plurality of parameters as shown by step 712. The request is received, at step 714, by a resource manager. Then, the list is evaluated at step 716 to determine a highest ranked one of the plurality of service options which can be used to provide the service. A reply to the request for service is transmitted at step 718 indicating which of the plurality of service options has been selected by the resource manager for providing the service 718 based upon its evaluation of the ranked service option list. From the RM 404's perspective, as shown in FIG. 7(c) a method for negotiating resources includes the step of receiving a request for a service, wherein the service request either explicitly provides, or implicitly refers to a list of a plurality of service options for providing said service 722.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for negotiating resources in a communication system comprising:
transmitting a service request, by a network interface of a service manager of a service provider network, towards a resource manager of an access network, said service request either explicitly provides, or implicitly refers to, a list of a plurality of service options for providing said service and includes an address of an end-user device and an identifier associated with the service; and
receiving, from the resource manager over the network interface, a reply to the transmitted service request, the reply indicating which of the plurality of service options has been selected by the resource manager for providing the service in accordance with an evaluation of the list of the plurality of service options, the evaluation of the list determining the highest ranked one of the plurality of service options that provides said service;
wherein the access network connects as the end-user device using the service.

2. The method of claim 1, wherein said service request explicitly provides said list of said plurality of service options and further wherein:

said request is a message including said list of said plurality of service options, each entry in said list including a plurality of parameters.

3. The method of claim 2, wherein said resource manager evaluating comprises:

evaluating said list to determine a highest ranked one of said plurality of service options which can be used to provide said service.

4. The method of claim 3, wherein said list of said plurality of service options includes ranking information associated with an end users preferences for receiving said service.

5. The method of claim 3, wherein said list of said plurality of service options is ordered based upon an end user's preferences for receiving said service.

6. The method of claim 1, wherein said plurality of parameters include at least one of:

a bandwidth to be used to provide said service, a codec to be used to provide said service and a format to be used to provide said service.

7. The method of claim 1, wherein said request does not include parameters associated with at least one of: a requested bandwidth, a requested codec and a requested format.

8. The method of claim 1, wherein said service manager is a server which provides the functions of publishing, discovering, subscribing, invoking and delivering Quality of Service (QoS) enabled services.

9. The method of claim 1, wherein said service is a movie to be provided from an application function to an end user.

10. A method for negotiating resources in a communication system comprising:

receiving, by a network interface of a resource manager of an access network connecting an end-user device using a service, from a service manager of a service provider network, a service request, said service request either explicitly provides, or implicitly refers to, a list of a plurality of service options for providing said service, and includes an address of the end-user device and an identifier associated with the service;

retrieving, at the resource manager, from an associated memory device, the list of the plurality of service options;

evaluating, at the resource manager, said list to determine a highest ranked one of said plurality of service options which can be used to provide said service;

selecting, at the resource manager, the determined highest ranked one of the plurality of service options; and transmitting, over a network interface of the resource manager, a reply to said request for service to the service manager, the reply indicating which of said plurality of service options has been selected by said resource manager.

11. The method of claim 10, wherein said service request explicitly provides said list of said plurality of service options and further wherein:

said request is a message including said list of said plurality of service options, each entry in said list including a plurality of parameters.

12. The method of claim 11, further comprising:

evaluating said list to determine a highest ranked one of said plurality of service options which can be used to provide said service, and transmitting a reply to said request for service indicating which of said plurality of service options has been selected by said resource manager for providing said service.

13. The method of claim 12, wherein said list of said plurality of service options includes ranking information associated with an end user's preferences for receiving said service.

14. The method of claim 12, wherein said list of said plurality of service options is ordered based upon an end user's preferences for receiving said service.

15. The method of claim 10, wherein said plurality of parameters include at least one of: a bandwidth to be used to provide said service, a codec to be used to provide said service and a format to be used to provide said service.

16. The method of claim 10, wherein said request does not include parameters associated with at least one of: a requested bandwidth, a requested codec and a requested format.

17. The method of claim 10, wherein said resource manager is a server which provides the functions of: reserving, allocating and monitoring network resources within a domain based on reservation requests received from a service manager.

18. The method of claim 10, wherein said service is a movie to be provided from an application function to an end user.

19. A communications node of a service provider network for negotiating resources in a communication system comprising:

a processor for transmitting, towards a resource manager of an access network that connects an end-user device using a service, a request for a service, wherein said service request either explicitly provides, or implicitly refers to, a list of a plurality of service options for providing said service and includes an address of the end-user device and an identifier of the service; and an interface for receiving a reply from said resource manager, the reply indicating a selection from said list as to which service option is to be supplied by said service provider network, the selection being made in accordance with an evaluation of the list of the plurality of service options, the evaluation of the list determining a highest ranked one of the plurality of service options that provides said service.

20. The communications node of claim 19, wherein said service request explicitly provides said list of said plurality of service options and further wherein:

said request is a message including said list of said plurality of service options, each entry in said list including a plurality of parameters.

21. The communications node of claim 19, wherein said plurality of parameters include at least one of: a bandwidth to be used to provide said service, a codec to be used to provide said service and a format to be used to provide said service.

22. The communications node of claim 19, wherein said service request implicitly refers to said list of a plurality of service options and further wherein:

said request is a message including an address of the end-user device and an identifier associated with said service.

23. The communications node of claim 22, wherein said request does not include parameters associated with at least one of: a requested bandwidth, a requested codec and a requested format.

24. The communications node of claim 10, wherein said communication node is a server which provides the functions of publishing, discovering, subscribing, invoking and delivering Quality of Service (QoS) enabled services.

25. The communications node of claim 19, wherein said service is a movie to be provided from an application function to an end user.

26. A communications node of an access network for negotiating resources in a communication system comprising:
   a memory device for storing a list of a plurality of service options; and
   a processor for receiving, from a service manager of a service provider network, a request for a service that either explicitly provides, or implicitly refers to, a list of a plurality of service options for providing said service and includes an address of an end-user device and an identifier associated with the service, for storing the explicitly provided list in the memory, for evaluating the list associated with the request for service to determine a highest ranked one of said plurality of service options that provide said service, and for transmitting a reply to said request for service indicating the determined highest ranked one of the plurality of service options,
   wherein the access network connects an end-user device using the service.

27. The communications node of claim 26, wherein said service request explicitly provides said list of said plurality of service options and further wherein:
   said request is a message including said list of said plurality of service options, each entry in said list including a plurality of parameters.

28. The communications node of claim 27, wherein said processor evaluates said list to determine a highest ranked one of said plurality of service options which can be used to provide said service, and transmits a reply to said request for service indicating which of said plurality of service options has been selected by said first node for providing said service.

29. The communications node of claim 28, wherein said list of said plurality of service options includes ranking information associated with an end user's preferences for receiving said service.

30. The communications node of claim 28, wherein said list of said plurality of service options is ordered based upon an end user's preferences for receiving said service.

31. The communications node of claim 26, wherein said plurality of parameters include at least one of: a bandwidth to be used to provide said service, a codec to be used to provide said service and a format to be used to provide said service.

32. The communications node of claim 26, wherein said request does not include parameters associated with at least one of: a requested bandwidth, a requested codec and a requested format.

33. The communications node of claim 26, wherein said first node is a server which provides the functions of publishing, discovering, subscribing, invoking and delivering Quality of Service (QoS) enabled services.

34. The communications node of claim 26, wherein said service is a movie to be provided from an application function to an end user.

* * * * *

UNITED STATES PATENT AND TRADEMARK OFFICE
CERTIFICATE OF CORRECTION

| | | |
|---|---|---|
| PATENT NO. | : 8,127,011 B2 | Page 1 of 1 |
| APPLICATION NO. | : 11/690453 | |
| DATED | : February 28, 2012 | |
| INVENTOR(S) | : Monette | |

It is certified that error appears in the above-identified patent and that said Letters Patent is hereby corrected as shown below:

On the Title Page, in Field (57), under "ABSTRACT", in Column 2, Line 8, delete "manage" and insert -- manager --, therefor.

In Column 14, Line 66, in Claim 1, delete "as the" and insert -- the --, therefor.

In Column 15, Line 15, in Claim 4, delete "users" and insert -- user's --, therefor.

In Column 15, Line 49, in Claim 10, delete "which can be used to" and insert -- to --, therefor.

In Column 16, Line 64, in Claim 24, delete "claim 10," and insert -- claim 19, --, therefor.

Signed and Sealed this
Nineteenth Day of June, 2012

David J. Kappos
*Director of the United States Patent and Trademark Office*